Jan. 2, 1962 H. H. TURNER 3,015,812
POSITIONING MECHANISM
Filed April 24, 1957 8 Sheets-Sheet 2
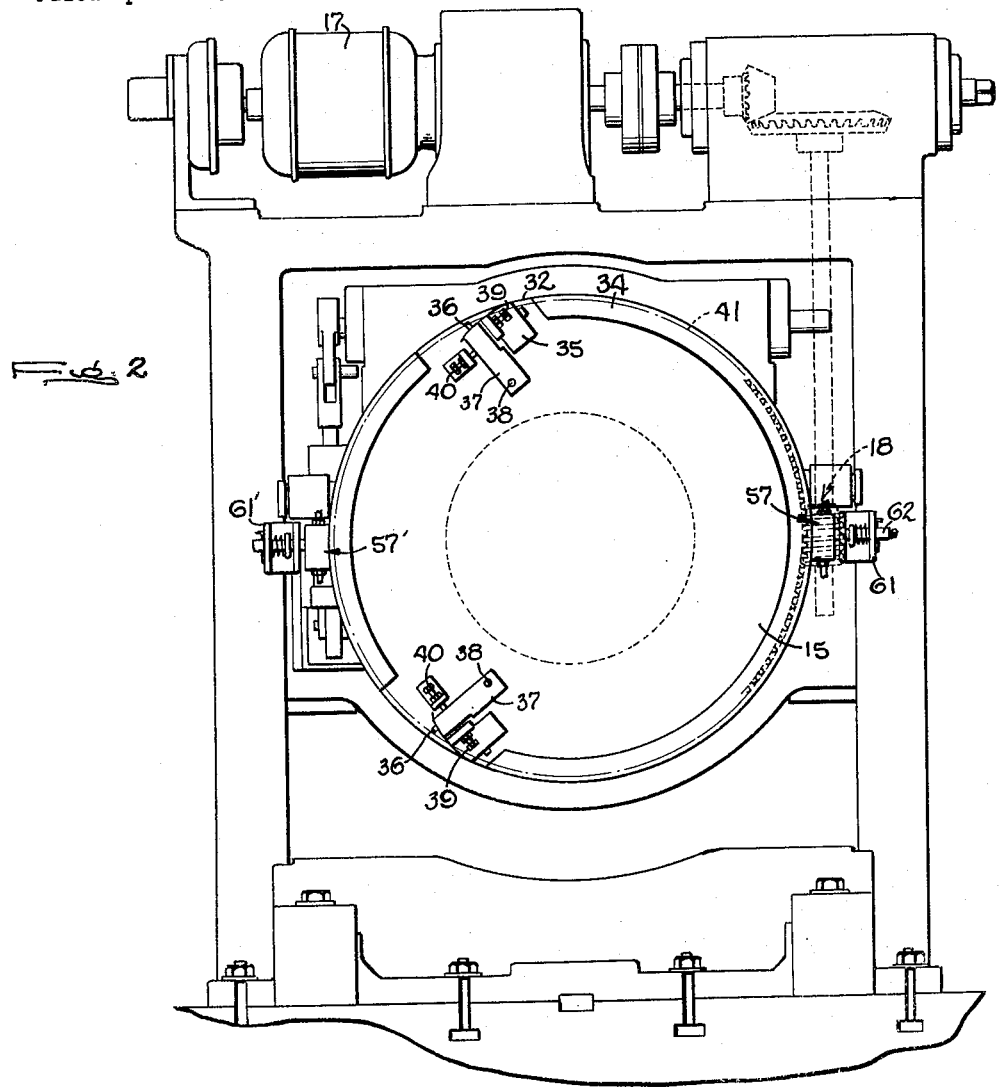
INVENTOR
Harold H. Turner
By Carlsen, Pitzner, Hubbard & Wolfe
ATTORNEY

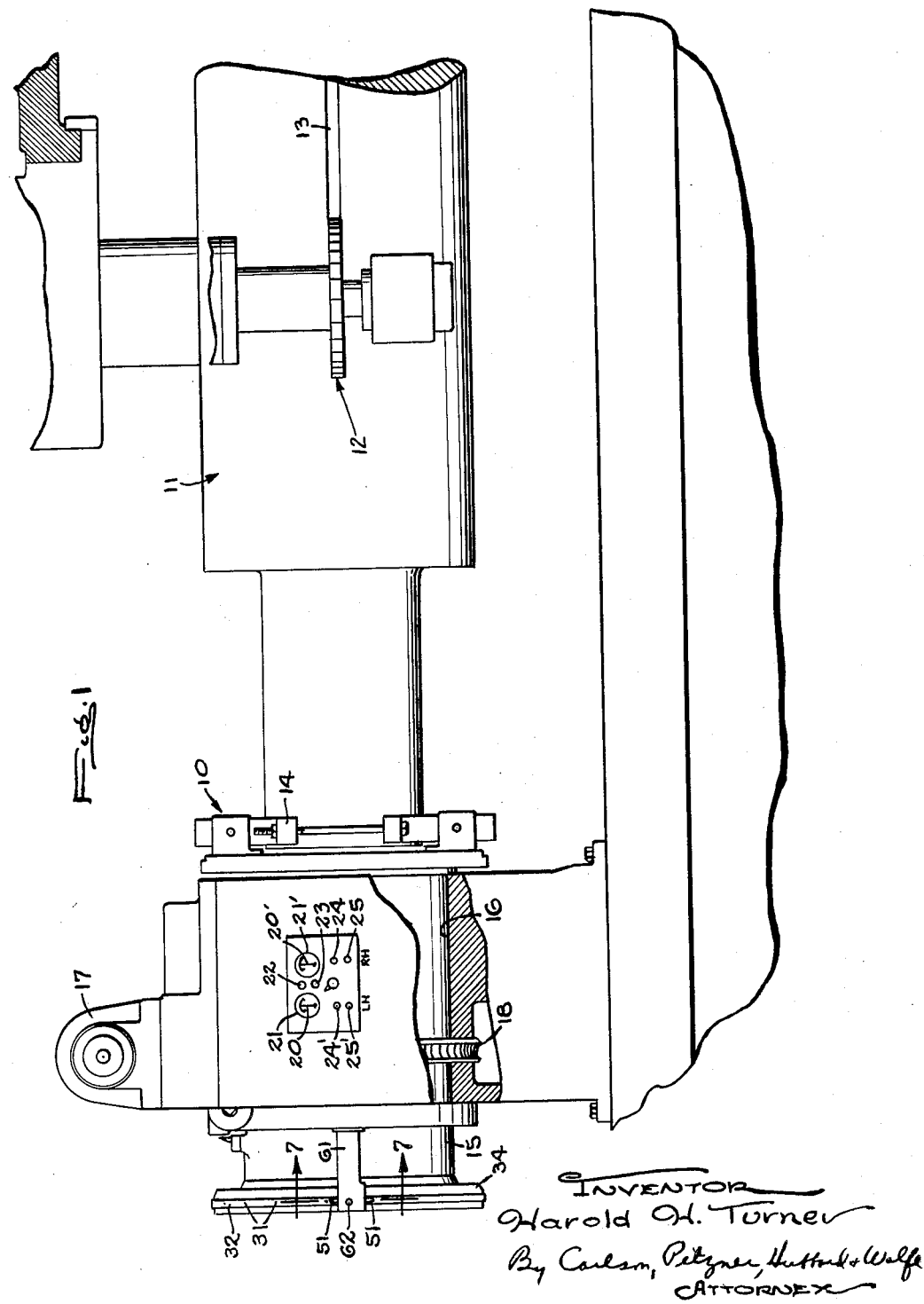

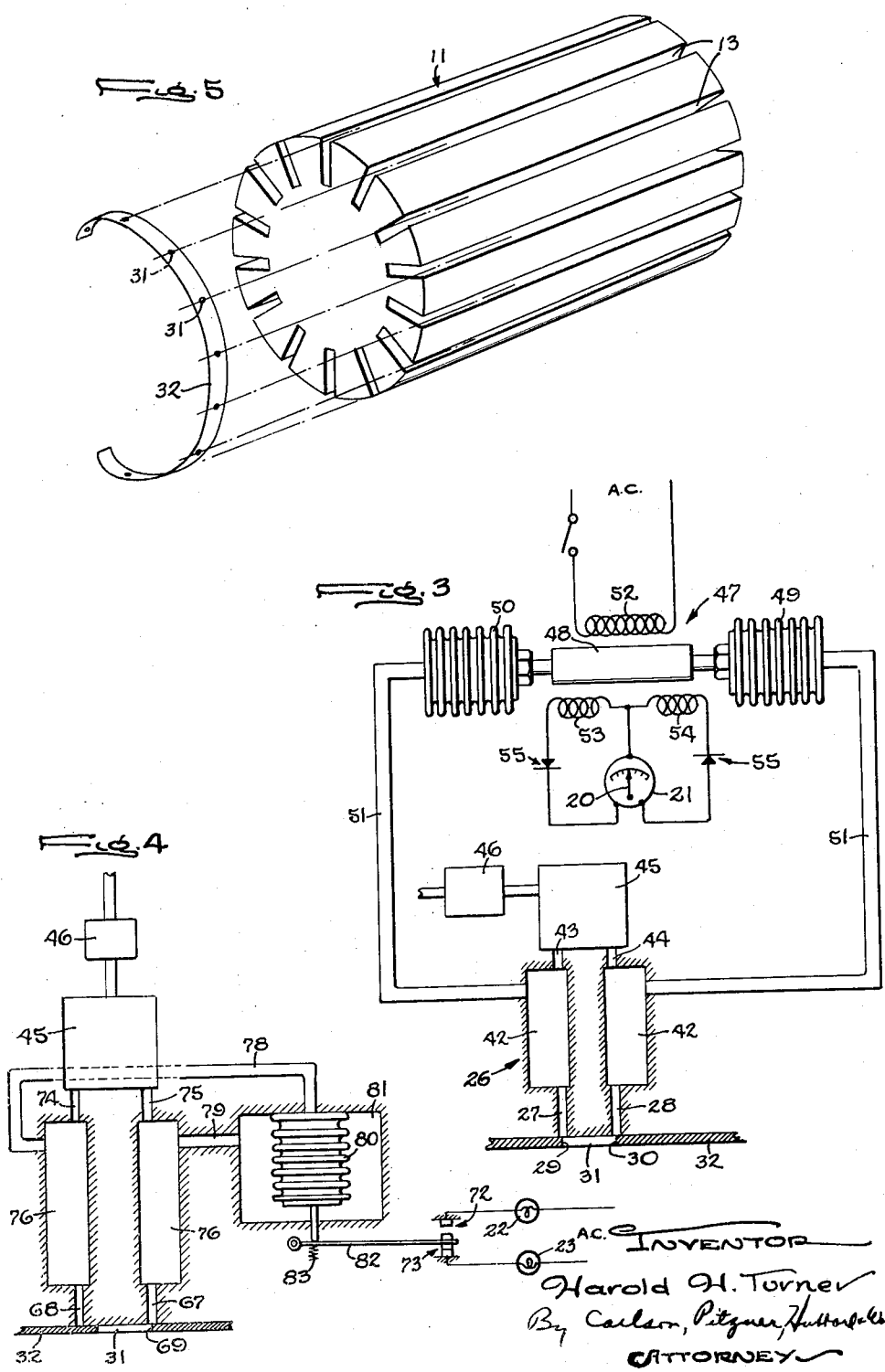

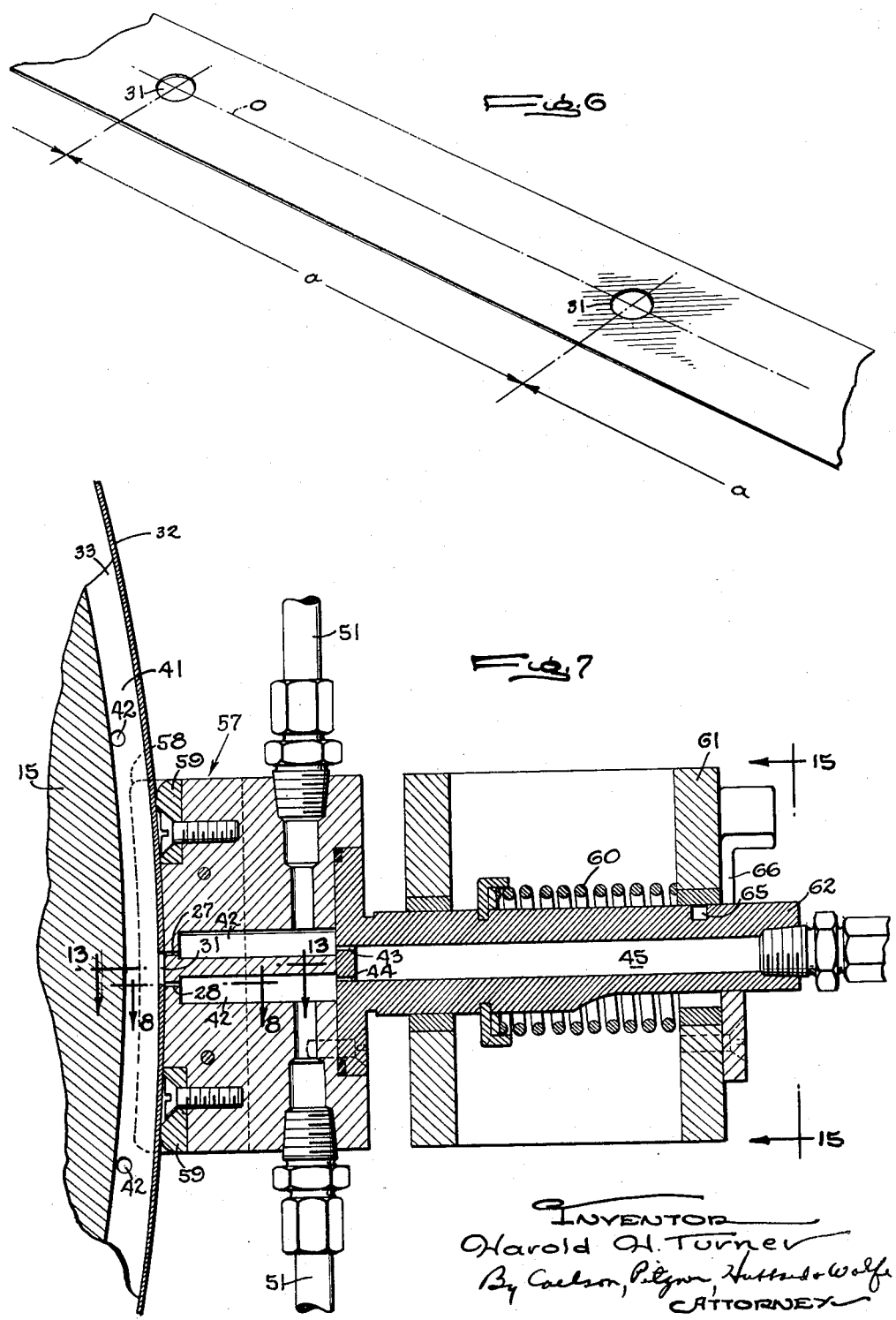

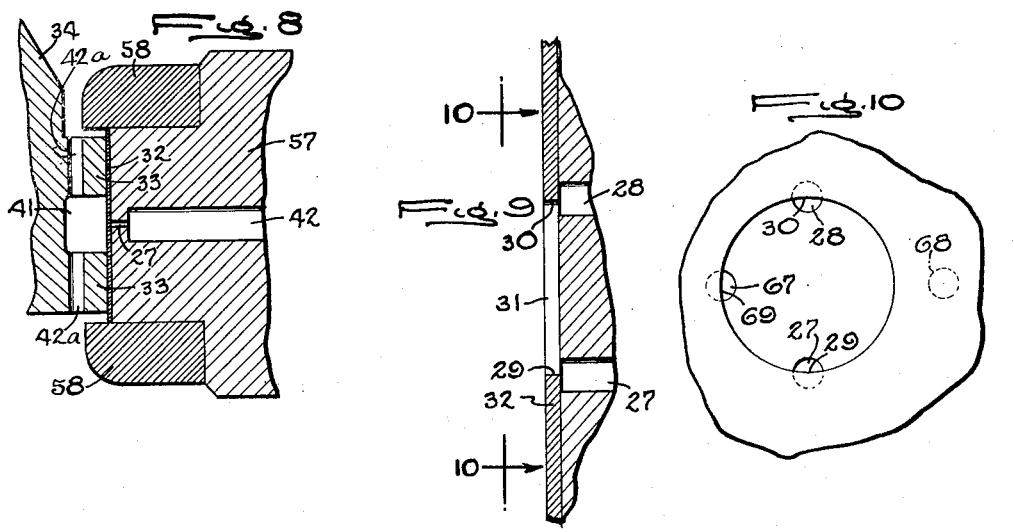
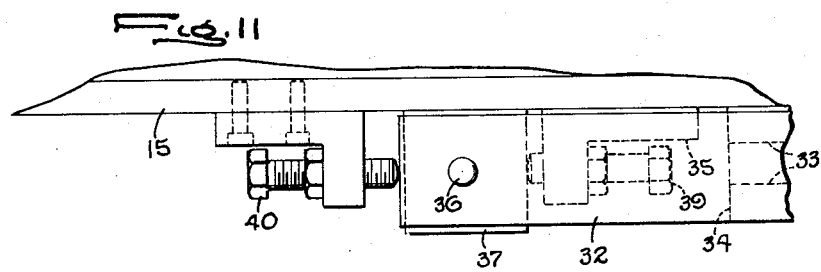
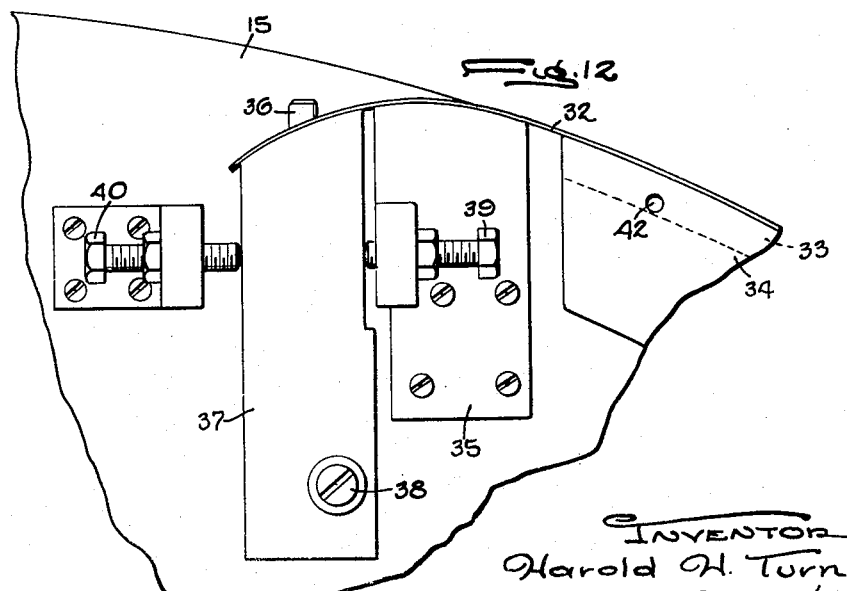

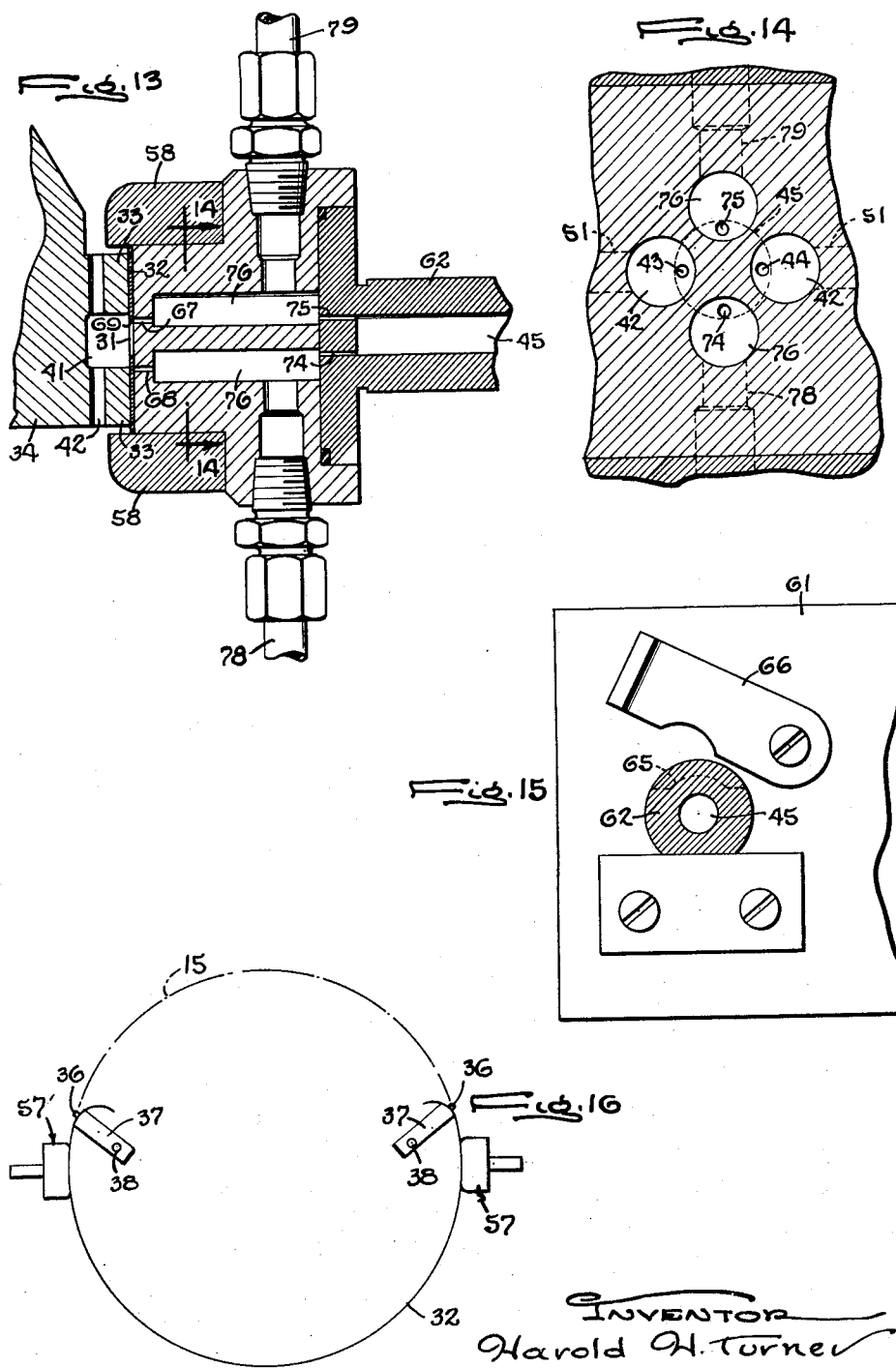

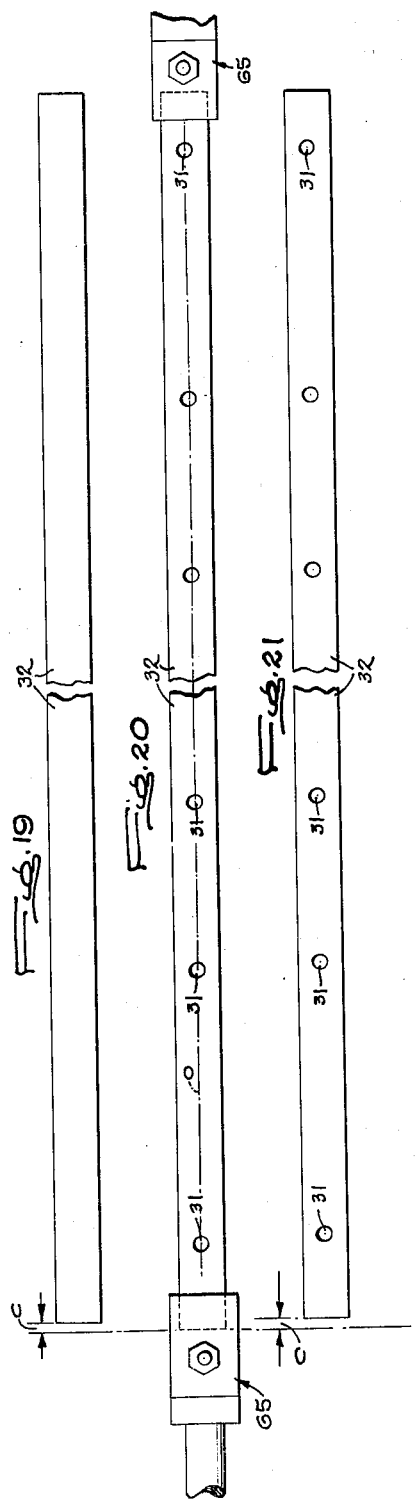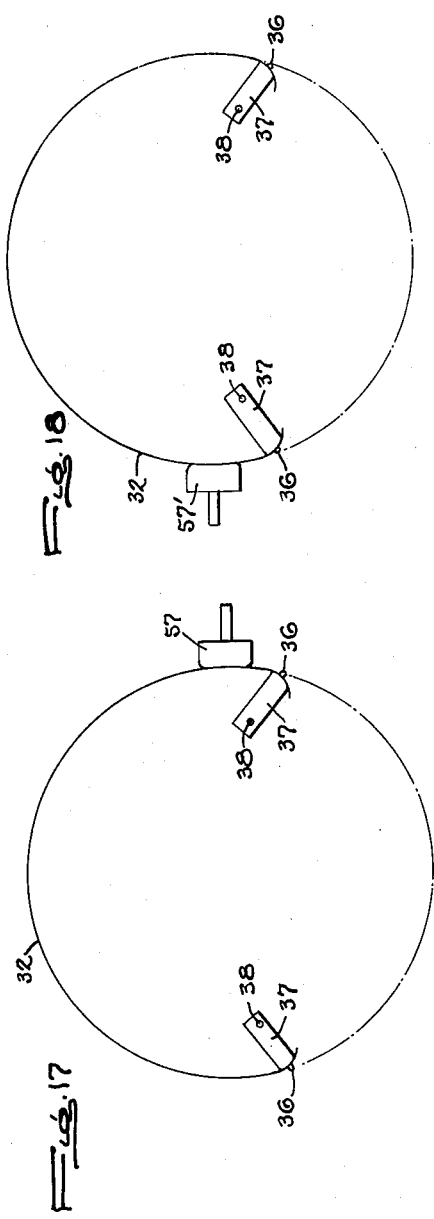

Jan. 2, 1962           H. H. TURNER           3,015,812
POSITIONING MECHANISM
Filed April 24, 1957           8 Sheets-Sheet 8
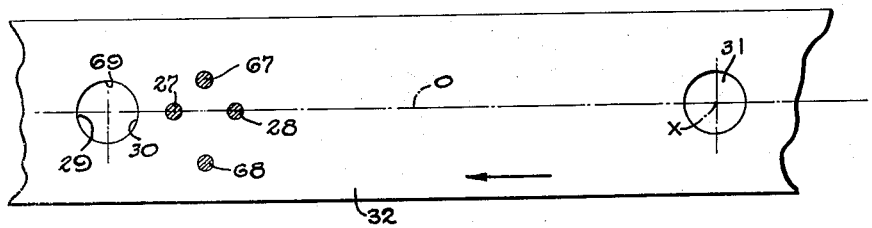
Fig. 22    RED LIGHT    METER READING ZERO
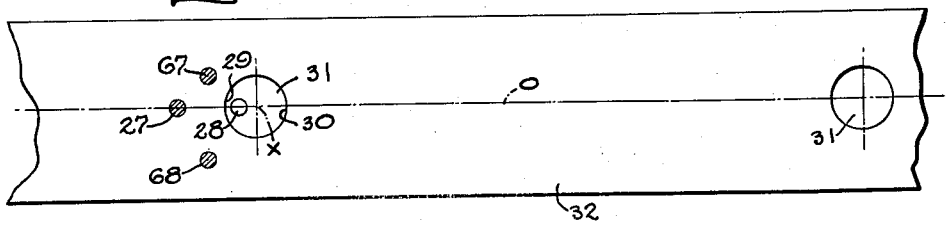
Fig. 23    RED LIGHT    METER UNBALANCED
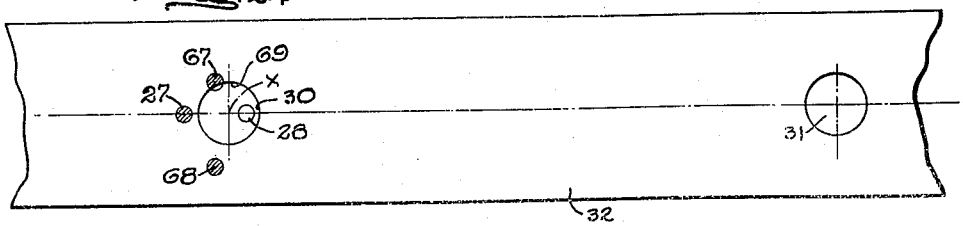
Fig. 24    NO LIGHT    METER UNBALANCED
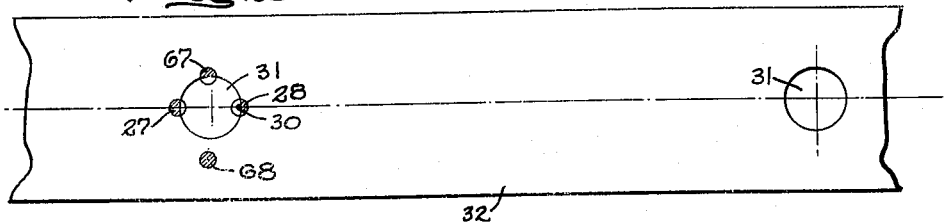
Fig. 25    GREEN LIGHT    METER UNBALANCED
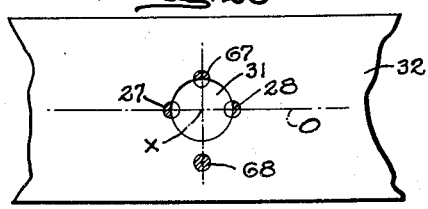
Fig. 26    GREEN LIGHT    METER READING ZERO
INVENTOR
Harold H. Turner
By Carlson, Pitzner, Hubbard & Wolfe
ATTORNEY

United States Patent Office 3,015,812
Patented Jan. 2, 1962

3,015,812
POSITIONING MECHANISM
Harold H. Turner, Rockford, Ill., assignor to The Ingersoll Milling Machine Company, Rockford, Ill., a corporation of Illinois
Filed Apr. 24, 1957, Ser. No. 654,924
9 Claims. (Cl. 340—282)

This invention relates to a mechanism for enabling an object to be moved or indexed to any selected one of a plurality of precisely located positions spaced along a predetermined path.

One object is to provide a mechanism for the above purpose in which the arrival of the movable object in any selected position is determined by a pneumatically controlled sensing device coacting with apertures spaced along an elongated member such as a flexible tape.

Another object is to utilize opposite edge portions of each aperture to vary the covering of a pair of control orifices and thus indicate conditions of balance or unbalance of the sensing device.

Still another object is to associated with the control member a novel means for indicating the positioning of the movable object at or near one of the selectable positions.

Other objects and advantages of the invention will become apparent from the following detailed description taken in connection with the accompanying drawings, in which FIGURE 1 is a fragmentary elevational view of a machine tool equipped with a positioning mechanism embodying the novel features of the present invention.

FIG. 2 is a side view.

FIG. 3 is a schematic view and circuit diagram of the pneumatic sensing device.

FIG. 4 is a similar view of the auxiliary pneumatic sensing device.

FIG. 5 is a perspective view of a workpiece illustrating the manner of its association with the perforated control member.

FIG. 6 is a perspective view of a portion of the perforated control member.

FIG. 7 is a fragmentary section taken along the line 7—7 of FIG. 1.

FIG. 8 is a fragmentary sectional view taken along the line 8—8 of FIG. 7.

FIG. 9 is an enlarged view of a portion of FIG. 7.

FIG. 10 is a fragmentary section taken along the line 10—10 of FIG. 9.

FIG. 11 is a fragmentary plan view of one of the tape tensioning devices.

FIG. 12 is an elevational view of the tensioning device shown in FIG. 11.

FIG. 13 is a fragmentary sectional view taken along the line 13—13 of FIG. 7.

FIG. 14 is a section taken along the line 14—14 of FIG. 13.

FIG. 15 is a fragmentary sectional view taken along the line 15—15 of FIG. 7.

FIGS. 16, 17, and 18 are diagrammatic views illustrating different steps in adjusting the control tape.

FIGS. 19, 20 and 21 show the perforated tape and the manner of conditioning the latter for temperature compensation.

FIGS. 22 through 26 are diagrammatic views showing different positions of the control tape and sensing orifices in the course of locating the moving object in a selected position.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

For purposes of illustration, the invention is shown in the drawings incorporated in a machine for indexing the support 10 for a cylindrical workpiece 11 to accurately defined angular positions so as to present different peripheral portions of the workpiece to one or more cutters 12 by which uniformly or non-uniformly spaced longitudinal slots 13 (FIG. 5) are cut in the piece. End trunnions of the workpiece are held in clamps 14 on the adjacent ends of drums 15 journaled in bearings 16 in the machine frame. A suitable reversible power actuator is provided for turning the drum 15 back and forth to bring the workpiece to a selected angular position. Herein, this actuator comprises an electric motor 17 mounted on the machine frame and coupled through gearing 18 to the inner end of the drum. By manipulating push buttons on a panel 19, the motor may be operated in either direction at rapid and slow speeds to turn the workpiece from one position to another and jog the piece precisely into any selected position.

While the improved positioning mechanism may be utilized to control the actuator automatically and stop the workpiece precisely in a selected position, it is shown herein simply as an indicating mechanism for signalling the arrival of the workpiece in the selected position. That is to say, the operator standing in front of the machine observes the pointer 20 of a meter 21 and red and green signal lamps 22 and 23 while manipulating run buttons 24 and 24' or jog buttons 25 and 25' corresponding to the different directions of indexing. When the workpiece is disposed between any two selectable positions, the red signal lamp 22 will be lighted and the pointer 20 will be on center. The approach of the workpiece to the selected position is indicated by extinguishment of the light 22 which is followed by lighting of the green lamp 23. At this time a condition of unbalance will be indicated by disposal of the pointer 20 off-center. Thereupon the indexing is continued by depressing the proper jog button and jogging the workpiece back and forth until the pointer is at zero which indicates that the workpiece is located precisely in the selected position.

In accordance with the present invention, the signal for indicating the presence of the workpiece precisely in a selected position is produced by a pneumatic bridge network 26 having orifices 27 and 28 coacting with pairs of edges 29 and 30 facing toward each other and longitudinally of the indexing motion, the several pairs being spaced along a path $o$ paralleling the indexing motion of the workpiece with the centers $x$ between the edges of successive pairs separated by distances $a$ (FIG. 6) and corresponding to selectable positions of the workpiece. While the edges 29 and 30 may be raised above the tape or defined by separate holes, they are defined herein by diametrically opposite arcuate portions of holes 31 centered at the points $x$. The spacing of these points may be uniform or non-uniform depending on positions of the slots 13 to be formed in the workpiece.

The apertures 31 are carried by a control member 32 which preferably comprises a tape about .010 of an inch thick and composed of hardened steel. While the apertures may take various shapes and locations such as notches along the tape margins, they are, in the present instance, circular holes, usually about ¼ of an inch in diameter, disposed between the edges of the tape with their centers spaced along a common centerline $o$ of the tape.

Preferably, the sensing device 26 is mounted stationarily on the machine frame and the tape is mounted on the outer end of the drum 15 and extended along an arc concentric with the axis around which the work is indexed. Herein the tape straddles and is laid around the outer surfaces of ribs 33 (FIGS. 7, 8, and 13) which extend around an arcuate flange 34 on the end of the drum. Beyond the flange ends, the apertured end portions of the tape are bent around the arcuate outer surfaces of blocks 35 (FIG. 12) and then hooked over and thus anchored on pins 36 projecting from the outer ends of blocks 37 pivoted at 38 on the drum 15.

The blocks 35 are bolted to the drum and carry screws 39 which, together with screws 40, may be adjusted to swing the intervening block 37 and thus vary the tension under which the tape is held around the arcuate ribs 33. The latter define a central channel 41 covered beneath the tape 32 and communicating with the holes 31 therein and with outwardly opening passages 42ª extending through the ribs.

The orifices 27 and 28, which are .040 of an inch in diameter in the present instance, are spaced apart a distance equal to the diameter of the holes 31 in the tape. That is to say, the centers of these orifices are ¼ of an inch apart in the present instance so that when the centers of the respective orifices coincide with the edges 29 and 30 of any hole 31, equal areas of the orifices will be uncovered as shown in FIG. 10.

The orifices 27 and 28 constitute two legs of a pneumatic bridge network and communicate with chambers 42 respectively connected to restrictions 43 and 44 (herein .025 of an inch in diameter) which constitute the other two legs of the bridge across which pneumatic pressure is applied by connection of these orifices to a chamber 45 supplied with air under a constant regulated pressure, for example 15 p.s.i., from a source 46. With this arrangement, the escape of pressure fluid from the chambers 42 and therefore the pressure drop across the other two corners of the bridge will be determined by the extent of relative overlapping of the orifices 27 and 28 by the edges 29 and 30 of the tape holes. That is to say, when both orifices are covered by the solid area of the tape or are uncovered to the same degree, the pressures in the chambers 42 will be balanced. At other times, when only one orifice is uncovered or the two orifices are uncovered different amounts, the bridge will be unbalanced as evidenced by a corresponding pressure difference between the chambers 42.

Such unbalance and the degree thereof may be measured accurately by a well known auto transformer 47 having an armature 48 coupled to the adjacent free ends of bellows 49 and 50 fixed at their opposite ends and communicating through pipes 51 with the respective chambers 42. An alternating voltage is impressed across the input coil 52 while the common terminal of the output coils 53, 54 is connected to one terminal of the meter 21 which may be a galvanometer. The other terminals of the latter are suitably connected through rectifiers 55 to the insulated terminals of the coils 53, 54.

When the pneumatic bridge above described is in balance, the pointer 20 will stand in the zero position. Unbalancing of the bridge in one direction or the other as evidenced by a pressure difference between the chambers 42, will result in swinging of the pointer off-center in a direction corresponding to the direction of the pressure difference. Thus the direction of deflection of the pointer away from the centered position will indicate to the operator which of the jog buttons 25 should be depressed in order to move the workpiece precisely to the selected position.

The orifices 27 and 28 of the sensing device 26 are formed in a head 57 (FIGS. 7 and 8) having flanges 58 which define a channel whose bottom wall is defined in part by nylon wear buttons 59. A tubular extension 62 of the head 57 houses the chamber 45 and is slidable in a bracket 61 projecting from the machine frame as shown in FIG. 1. A spring 60 coiled about the extension 62 urges the head 57 toward the tape 32 thus seating the latter in the bottom of the head channel and against or at least closely adjacent the orifices 27 and 28. Thus, pressure fluid may escape freely through one of the orifices only when a portion thereof is uncovered, both orifices being covered by a solid area of the tape 32 as shown in FIG. 22.

In actual service use, the tape may become spaced a few thousandths of an inch from the orifices without interfering with the intended operation of the bridge because such spacing and the escape of fluid will be the same from both orifices.

For a purpose to appear later, two of the pneumatic sensing heads 57 and 57' of the same construction are provided in the present instance (see FIGS. 2, 16–18), these being disposed on diametrically opposite sides of the drums 15 and precisely located with the centers between the two pairs of orifices 27 and 28 angularly spaced apart a known distance, 180 degrees in this instance, corresponding to the spacing of the terminal holes 31 at opposite ends of the tape. The second head is equipped with a pneumatic bridge including orifices 27, 28, restrictions 43, 44, an auto transformer and a meter 21' having a pointer 20' (FIG. 1) of the same construction and adapted to operate in the same manner as the sensing head first described.

During their original installation, the sensing heads 57 and 57' are held retracted away from the tape. This is accomplished by forming the mounting tube 62 (FIGS. 7 and 15) of each head with a notch 65 which, when the tube is retracted, is adapted to receive a latch 66 pivoted on the head.

The measuring mechanism above described operates with great accuracy because the tape is conditioned in a novel manner such that the spacing of the holes 31 remains precisely fixed in spite of wide variations in ambient temperature which occur in service use and which, in view of the positive coefficient of thermal expansion of hardened steel, would be expected to produce expansion or contraction of the tape and thus alter the spacing of the holes. To avoid this, the holes 31 are formed while the tape is held in a stretched condition and thus elongated by an amount which is greater than the expansion which would result from the temperature changes to which the tape is subjected in service. The tape thus prepared is mounted in the measuring mechanism under the same degree of stretch thus restoring the desired precise spacing of the holes. In this stretched condition, the only effect of ambient temperature changes will be to change the tension within the tape, there no elongation or contraction at any time during service use of the mechanism.

This method of conditioning the tape is illustrated in FIGS. 19, 20 and 21. The tape of the original length shown in FIG. 19 is gripped at its ends by clamps 65 and elongated as shown in FIG. 20 by an amount $c$ which is calculated from the thermal characteristics of the tape metal and the temperature range (for example, 150 degrees F.) likely to be encountered in service, this amount of stretching being well within the elastic limit of the metal. While the tape is held in this condition in the stretching fixture, the holes 31 are formed by any suitable method such as drilling, punching, grinding, or electric erosion at the points $x$ corresponding precisely to positions in which the workpiece is to be indexed under the control of the present mechanism.

Now, when the clamps are disengaged and the tension in the tape thus released, the tape will contract by the amount $c$, the spacing of the hole centers changing correspondingly. Finally, the tape is wrapped around the ribs 33 and the blocks 35 and interlocked with the pins 36 so as to be mounted on the drum 15 as above described. By tightening the screws 39, the tape is again elongated and stretched to substantially the same degree as during the formation of the holes, thus restoring the desired spacing of the holes. Since such elongation is greater than the thermal expansion which would take place in service if the tape were not tensioned, the only effect of ambient temperature changes on the stretched tape is to vary the degree of the tension in the tape. In other words, the spacing of the holes 31 in the stretched tape remains constant even though the tape may in actual service use be subjected to temperature changes over a relatively wide range.

FIGS. 16, 17 and 18 illustrate the manner of checking the accuracy of the perforated tape and adjusting the same for use in moving the workpiece to the desired positions. After mounting on the drum 15 as above described, the tape will extend around the upper half of the drum with opposite end portions extending past the heads 57 and 57' which are advanced to their operative positions. One of the latter, for example 57 (FIG. 17) will be first used. By manipulating the screws 39 and 40 at the adjacent end of the tape, the latter is shifted endwise around the drum until the terminal hole 31 is precisely centered relative to the orifices 27 and 28 as evidenced by a zero reading on the meter 21.

Next, the head 57 is used as illustrated in FIG. 18. The screws 39 and 40 at the adjacent end of the tape are then adjusted to stretch the tape around the drum and bring the terminal hole at this end of the tape into precisely centered position with respect to the orifices 27 and 28 of the sensing head 57', this condition obtaining when the pointer 20' stands at zero. At this time, the tension in the tape will be the same as during the formation of the holes 31 and therefore the latter will be spaced around the drum in accordance with the desired spacing of the positions to which the workpiece is to be indexed.

As a final check on the accuracy of the adjustment, the drum is turned through a precisely measured angle, for example, a half revolution as shown in FIG. 16 thus bringing the terminal hole at the other end of the tape into association with the sensing head 57'. If the tape is properly constructed and mounted, the orifices 27 and 28 of this head will be centered precisely on the terminal hole and the pointer 20' will stand at zero.

It will be observed that the sensing heads 57, 57' constructed as above described will be balanced, the pointer 20 being at zero, in many different positions of the work support and two different relations between the tape and the sensing orifices 27, 28. One of these conditions (see FIG. 22) is when both orifices are exposed to and covered by a solid area of the tape between the holes 31. The other and useful condition is that illustrated in FIGS. 10 and 25 in which the orifices are precisely centered relative to a hole 31 and equal portions of the orifices are uncovered by the hole.

In another of its aspects, the invention provides means for distinguishing between these two conditions of balance and signalling the centering of the hole on the orifices or the approach of the hole to such position. This means comprises a separate feeler system which in the present mechanism and to a special purpose to appear later, is a pneumatic bridge having a pair of orifices 67 and 68 (FIGS. 4, 10) disposed adjacent the orifices 27, 28 in each of the heads 57, 57' and arranged to coact with at least one other edge 69 formed on the tape in close association with the respective pairs of edges 27, 28. In the present instance, the orifices 67 and 68 are spaced apart transversely of the tape and disposed in a plane perpendicular to the plane of the orifices 27 and 28 and midway between the latter so as to permit one of the side edges of each hole 31 to form the edge 69. The orifice 68 is spaced outwardly beyond the path of the holes 31 and therefore remains covered in all positions of the work support except when, as is sometimes the case herein, the entire length of the tape is run past this orifice. The other orifice 67 is positioned to overlap and become at least partially uncovered by the edge 69 as the associated hole 31 approaches (see FIG. 24) the centered relation (FIG. 25) with respect to the main orifices 27, 28. Thus, in the centered relation, about half of the orifice 67 is uncovered while the associated orifice 68 is completely covered by the tape.

Herein the covering and uncovering of the orifice 67 is utilized through a pneumatic bridge network similar to the main network above described to actuate switches 72, 73 and thus control the lighting of the signal lamps 22 and 23. Accordingly, the orifices 67, 68 communicate with chambers 76 which lead to the other legs of the pneumatic bridge formed by restrictions 74, 75 similar to the restrictions 43, 44 of the main senser. The restrictions 74, 75 communicate with the chamber 45 supplied with compressed air from the source 46.

To close the switches 72, 73 at the proper times, passages 78 and 79 connect the respective chambers 76 to the interior and exterior of a bellows 80 fixed on one end and disposed within a casing 81. The free end of the bellows is joined to a pivoted tongue 82 carrying the common contact of the two switches. When both of the orifices 67, 68 are covered, the pressures in the chambers 76 will be equalized and the switch 72 controlling the red light 22 will be closed by the biasing force of a spring 83. As the edge 69 of one of the holes 31 is presented to the orifice 67 during movement of the tape 32 and workpiece, the pressure outside of the bellows will be reduced thus allowing the internal pressure to overcome the spring 83. The arm 82 is first moved to open the switch (FIG. 24) and then continued to close the switch 73. The resulting lighting of the green light 23, when the orifices are conditioned as shown in FIG. 25, signals approach of the hole 31 to the next selectable position. This lamp remains lit as the workpiece continues on to the selected position in which the hole is centered relative to the orifices as shown in FIG. 26.

The second orifice 68 is used in the present instance in order to preserve the balanced condition of the sensing system when, as is desired in the disclosed installation, to sometimes move the entire length of the tape past the active sensing head. When this occurs, the orifice 68 will become uncovered along with the orifice 67 and the secondary bridge network will remain in balance.

In installations where the feeler orifices 27, 28 always remain exposed to the tape, the switches 72, 73 may be actuated by a simple pressure switch. That is to say, the orifice 68 and associated connections may be omitted and the bellows arranged to respond to pressure changes resulting from covering and uncovering of the orifice 67 alone. It will be apparent that the orifice 67 may, if desired, be arranged to operate in conjunction with tape apertures other than those controlling the main pneumatic bridge.

Considering now a typical measuring operation, let it be assumed that the workpiece and the tape are being moved to the left, the tape being located as shown in FIG. 22 with the selected hole 31 at the right in FIGS. 22 and 23 spaced from all of the orifices 27, 28, 67 and 68 which are thus covered by a solid area of the tape. Both bridge networks are then in balance as a result of which the red lamp 22 is lighted and the pointer 20 is at zero. As the operation of the feed motor is continued, the orifice 28 is the first to be uncovered by the hole as shown in FIG. 23, the meter 20 then indicating unbalance of the main feeler. When the workpiece approaches nearly to the selected position, the hole starts to pass and uncover the orifice 67 as shown in FIG. 24 as a result of which the secondary bridge or pressure switch operates to extinguish the red light 22. Immediately thereafter and when a larger amount of the orifice 67 has been uncovered as shown in FIG. 25, the switch 73 will be closed and the green lamp 23 lighted thus indicating the approach of the workpiece close to the selected position.

In response to this signal, the operator releases the run button, and by means of the jog button 25, effects the final positioning of the workpiece. That is to say, the workpiece is jogged back and forth until the pointer 20 of the meter 21 stands at zero. As a result of the tape hole becoming precisely centered relative to the orifices 27, 28, equal areas of the latter then being uncovered to balance the pneumatic bridge as shown in FIG. 26. The workpiece is then disposed precisely in the selected position.

It will be apparent from the foregoing that the tape 32 constructed and mounted as above described constitutes a member movable along a predetermined path and that the spaced holes 31 and the intervening solid surfaces alternating therewith along the tape define pairs of edges 29, 30 closely spaced the same as the orifices 27, 28 so that the pneumatic network is balanced when the fluid flows from the orifices are equal as when the flows are intercepted by the edges 29, 30 as shown in FIGS. 3 and 10 and equal areas of the orifices are uncovered by centering of the orifices relative to these edges. On the other hand, the network is unbalanced when, as shown in FIG. 4, only one of the edges of a pair is alined with one orifice or when both edges are so alined but off-center relative to the orifices. The network is also balanced when neither of the orifices is exposed to one of the edges 29, 30 and the air flows are thus equalized, this condition obtaining in the present instance when both of the orifices are exposed to solid areas of the tape surface.

It will also be apparent that the accuracy of the disclosed measuring device does not depend on a precise spacing of the control edges 29, 30 from each other but rather on the location of the center between such edges. That is to say, it is the equal uncovering of the orifices 27, 28 by the edges 29, 30 in the centered position of the two rather than in the amount of uncovering of the two orifices.

I claim as my invention:

1. The combination of, a member mounted for movement along a predetermined path, an elongated tape extending along said path and movable in unison with said member, a plurality of apertures formed in and spaced along said tape and defining pairs of opposed edges with the centers between the edges of the successive pairs spaced along said member, a feeler head lying adjacent one face of said tape and having orifices of equal size spaced along said path to correspond to the spacing of said edges so as to be uncovered equal amounts when any one of said pairs of edges is centered relative to the orifices, said orifices being covered by said tape or uncovered unequal amounts by said apertures in other positions of said tape and member, means providing a balanceable pneumatic network including said orifices and balanced either when both of said orifices are covered by solid areas of said tape or partially and equally uncovered by exposure to one of said apertures, and means for sensing balance and unbalance of said network whereby to indicate the centering of any selected one of said apertures relative to said feeler head.

2. A positioning mechanism as defined by claim 1 in which said tape apertures are circular holes.

3. A positioning mechanism as defined by claim 2 in which said orifices are circular and of smaller diameter than said holes with the centers of the orifices disposed at opposite ends of a diameter of said holes when said network is balanced by centering of one hole relative to said orifices.

4. A positioning mechanism as defined in claim 1 having indicating means for distinguishing between said two conditions of balance of said network.

5. A positioning mechanism as defined in claim 1 having two indicating devices, one responsive to a balance of said network by covering of both of said orifices and the other responsive to the disposal of one of said apertures at or near said other condition of balance.

6. A positioning mechanism as defined in claim 1 having a device for indicating when said tape is approaching or disposed at a position of balance of said network, said device including a third orifice in said head exposed to said tape and uncovered by apertures therein when a pair of said edges is approaching a centered position relative to said orifices, means for delivering pressure fluid to said third orifice, and means for sensing pressure changes resulting from covering and uncovering of said third orifice.

7. A positioning mechanism as defined in claim 1 having means for holding said tape stretched longitudinally to a degree sufficient to prevent ambient temperature changes from affecting the spacing of the apertures in the tape.

8. The combination of, a member mounted for movement along a predetermined path and having an elongated surface extending along said path, a plurality of apertures formed in said member and spaced along said surface, said apertures being defined by pairs of closely spaced opposed edges with the centers between the edges of the successive pairs spaced along said member, a feeler head lying adjacent one face of said surface and having orifices of equal size spaced along said path to correspond to the spacing of the edges of said pairs so as to be uncovered equal amounts when any one of said pairs of edges is centered relative to the orifices, said orifices being covered by said surface or uncovered unequal amounts by said apertures in other positions of said member, means providing a balanceable pneumatic network including said orifices and balanced either when both of said orifices are covered by solid areas of said surface or partially and equally uncovered by exposure to one of said apertures, and means for sensing balance and unbalance of said network whereby to indicate the centering of any selected one of said apertures relative to said feeler head.

9. The combination of, a member mounted for movement along a predetermined path and having recesses and surfaces alternating with each other and spaced along an exposed side of the member, the opposite ends of said surfaces defining a plurality of pairs of closely spaced edges with the centers between the edges of said successive pairs spaced along said path according to the distances to be measured, a feeler head lying adjacent said exposed side of said member and having orifices of equal size spaced along said path to correspond to the spacing of the edges of said pairs so as to be uncovered equal amounts when any one of said pairs of edges is centered relative to the orifices, each of said orifices being covered by one of said surfaces or uncovered by one of said recesses when the orifices are out of alinement with said edges, means providing a balanceable pneumatic network including said orifices and means for delivering pressure fluid through the orifices, said network being balanced when the fluid flows from the respective orifices are equal and unbalanced when said flows are unequal by exposure of the orifices to one or both of the edges of one of said pairs but with the orifices offset between the center of such edges, and means for sensing balance and unbalance of said network whereby to indicate the centering of any selected one of said pairs of edges relative to the orifices of said feeler head.

References Cited in the file of this patent

UNITED STATES PATENTS

| 801,922 | Shaffer | Oct. 17, 1905 |
| 1,116,079 | Kondolf | Nov. 3, 1914 |
| 1,616,607 | Clokey | Feb. 8, 1927 |
| 1,783,507 | Kapps | Dec. 2, 1930 |

FOREIGN PATENTS

| 556,607 | Great Britain | Oct. 13, 1943 |

OTHER REFERENCES

Publication: "Surveying Theory and Practice," by J. C. Tracy; printed June 1955, by John Wiley & Sons, Inc., New York, page 861.